United States Patent
Kurtz et al.

(10) Patent No.: US 7,000,484 B2
(45) Date of Patent: Feb. 21, 2006

(54) LOAD BEAM APPARATUS OPERATIVE TO PREVENT IMPROPER OPERATION DUE TO OFF AXIS LOADS

(75) Inventors: Anthony D. Kurtz, Ridgewood, NJ (US); Adam Kane, Morristown, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/396,241

(22) Filed: Mar. 25, 2003

(65) Prior Publication Data

US 2004/0187594 A1    Sep. 30, 2004

(51) Int. Cl.
    *G01N 3/00* (2006.01)
(52) U.S. Cl. .................................................. 73/796
(58) Field of Classification Search .......... 73/794–798, 73/808, 9–10
    See application file for complete search history.

(56) References Cited

U.S. PATENT DOCUMENTS

| | | | |
|---|---|---|---|
| 3,640,118 A * | 2/1972 | Geis | 73/9 |
| 4,735,102 A * | 4/1988 | Koenig | 73/862.474 |
| 5,311,763 A * | 5/1994 | Gibbs et al. | 73/9 |
| 5,973,590 A | 10/1999 | Kurtz et al. | 338/42 |
| 6,176,139 B1 * | 1/2001 | Seils et al. | 73/796 |
| 6,490,935 B1 * | 12/2002 | Joki et al. | 73/862.49 |
| 6,561,049 B1 * | 5/2003 | Akiyama et al. | 74/89.32 |
| 6,601,455 B1 | 8/2003 | Kurtz et al. | |
| 6,662,645 B1 * | 12/2003 | Brewer | 73/152.48 |
| 2002/0104380 A1 * | 8/2002 | Brewer | 73/796 |

* cited by examiner

*Primary Examiner*—Max Noori
*Assistant Examiner*—Alandra Ellington
(74) *Attorney, Agent, or Firm*—Plevy, Howard & Darcy PC

(57) ABSTRACT

A beam transducer employs a linear bearing which surrounds the active element of the transducer which is the beam. One end of the bearing is welded to the inactive end of the load beam. The other end of the bearing is not welded, allowing the active end of the beam to move freely. The linear bearing eliminates friction and jamming which will cause inaccurate load measurement, but the ability to allow the active element to move freely with one end free enables the load beam sensitivity to be maximized. The free end is sealed environmentally by employing a flexible metal membrane or diaphragm which is welded between the bearing end and the load beam. This configuration provides a hermetic seal to protect the load beam and the sensitive gages which are placed on the load beam.

11 Claims, 6 Drawing Sheets

LOAD BEAM APPARATUS OPERATIVE TO PREVENT IMPROPER OPERATION DUE TO OFF AXIS LOADS

FIELD OF INVENTION

This invention relates to transducers in general and, more particularly, to a load beam transducer configured to prevent off axis loads from effecting the output.

BACKGROUND OF THE INVENTION

As is known in the prior art, load cells generally function in pure axial tension and compression. In certain applications, off axis loads are involved. These loads can result in inaccurate measurements or could, in fact, damage the load cell. Many commercial load cells use a metal diaphragm fitted with foil strain gages. These diaphragms result in larger diameter designs. They also use thin membranes to mitigate off-axis loads. The membranes are situated on both ends of the load cell and are usually between the fixed outer rim and the active central core. In any event, to minimize the size of a tension/compression load cell, a load beam fitted with strain gauges is employed. The beam is small in size (as, for example, 0.085×0.270 inches). As indicated, the load beam basically is a relatively thin platform and is the active sensing element. The beam is designed for maximum micro strain on the gages located on the beam at maximum rated load. In tension or compression, the load beam can accept off axis perturbations to about 36 inch pounds before yielding and deforming the beam. These loads will be encountered especially in the compression mode, where beam-buckling can also occur. In any event, the critical buckling load is 16 times less, without side support for guiding the load beam in compression.

It is apparent that there is a need in operating such beam transducers to prevent the beam from bending and therefore, subjecting the beam to side loads. The side loads are sensed by the strain gages employed on the beam and added to the load cell readings, resulting in erroneous data.

It is therefore an object of the present invention to eliminate the side load readings without effecting the axial tension and compression forces impressed on the load beam.

SUMMARY OF INVENTION

A force transducer comprises a beam which has strain gages positioned thereon and has a beam positioned between a front housing section and a rear housing section. A linear bearing surrounds the beam and the portion of the front and rear housing sections, and one end of the bearing is fixed to one of the housing sections and the other end of the bearing is free to move, wherein the beam, when subjected to an off-axis force, will mainly respond to the axial tension and compression force while mitigating the effects of side load forces.

BRIEF DESCRIPTION OF THE FIGURES

FIG. 1 includes FIG. 1A, FIG. 1B and FIG. 1C where

DETAILED DESCRIPTION OF THE FIGURES

Figure 1A:
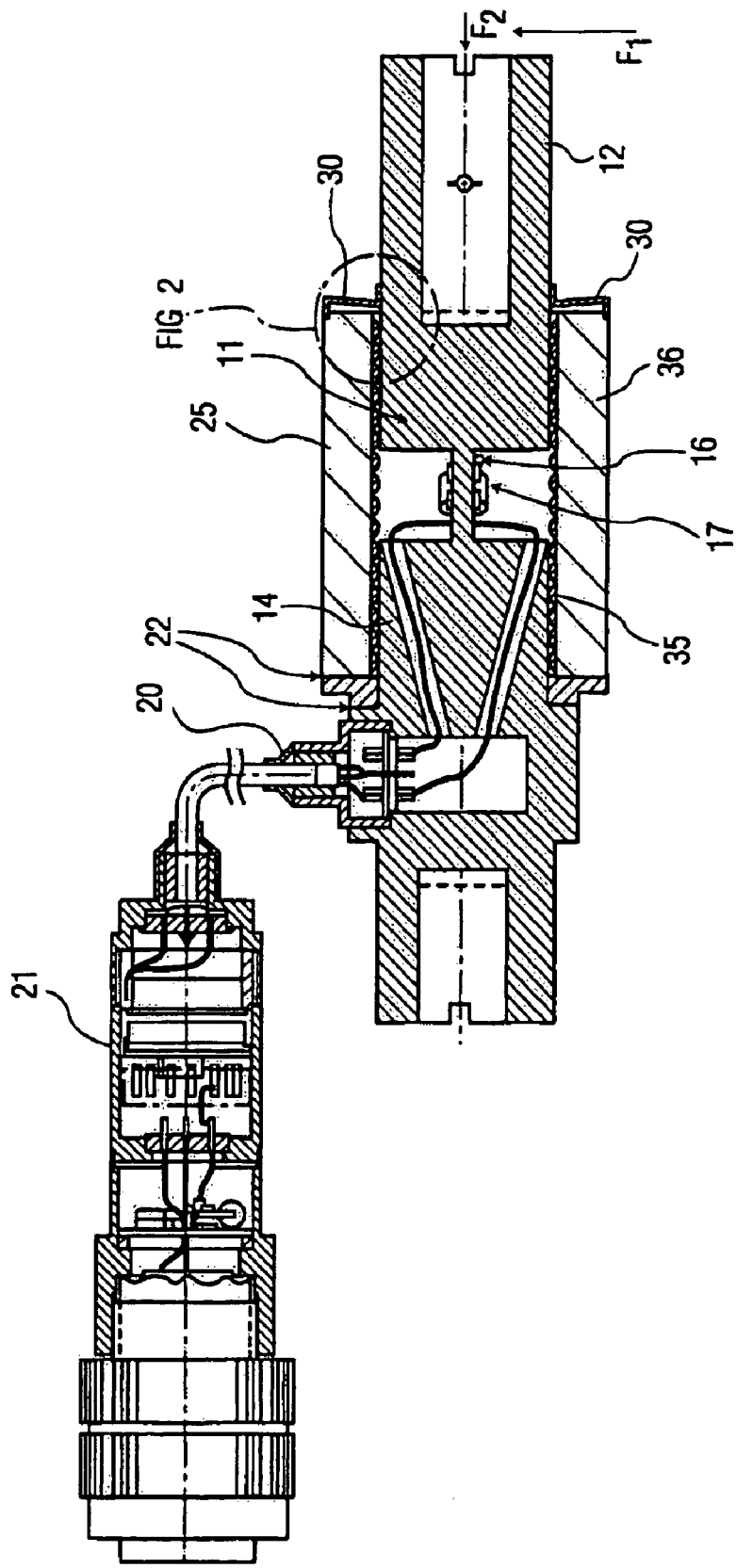
FIG. 1A is a cross sectional view of a transducer employing a beam and utilizing the linear bearing.
Figure 1B:
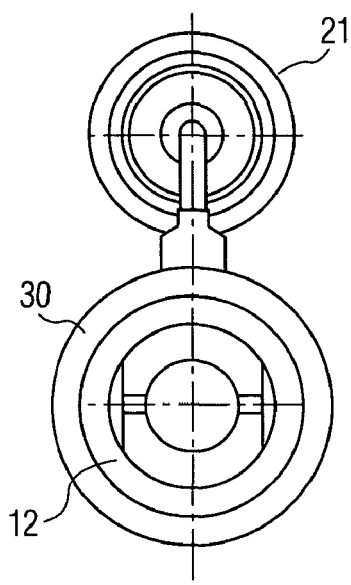
FIG. 1B is a right side view of a transducer employing a beam and utilizing the linear bearing and FIG. 1C is a left side view of a transducer employing a beam and utilizing the linear bearing, according to this invention.
Figure 1C:
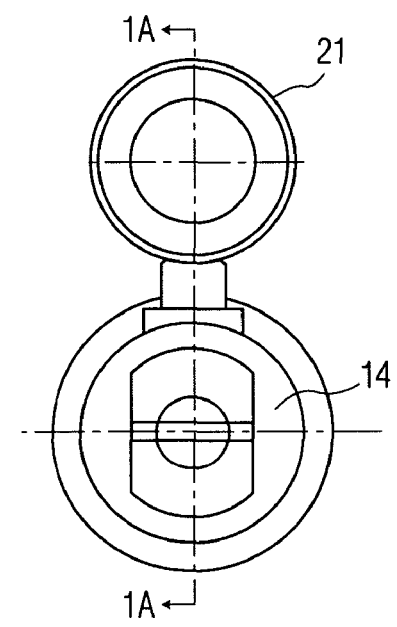

Referring to FIG. 1A, there is shown a cross sectional view of a typical beam transducer employed in this invention. As seen in FIG. 1, a load cell body 11 contains a front end 12, which is designated as the active side and a rear end 14 referred to as the fixed side. Located between sections 11 and 14 is a load beam 16. The load beam 16 has strain gages 17 employed thereon. Essentially, the beam configuration depicted in FIG. 1A is conventional and is well known. Reference, for example, is made to a co-pending application entitled, "Force Transducer with Environmental Protection", having U.S. Ser. No. 09/814,903, which was filed on Mar. 22, 2001. The beam 16 is relatively small and has two sensors placed on the top surface and two on the bottom surface. The wires for the sensors are directed through apertures in the load cell body section 14. The wires are then directed to a connector assembly 20, which is directed to an electronic module assembly 21. All this is well known.

In any event, as seen in FIG. 1A the load beam 16 is surrounded by a bearing 25. The bearing 25 is a linear bearing and is placed about the active element to mitigate the effects of side loads and prevent destruction of the load cell. Linear bearings are well known and essentially include an outer housing or case 36 containing an inner race having ball bearings 35. The outer housing or case 36 is cylindrical and fabricated from a metal such as steel. There is a central aperture into which the beam 16 portion of the housings 12 and 14 are accommodated. As indicated, one end of the bearing, namely the outer case, is welded by means of a weld 22 to the body 14. The other end of the bearing is not welded, allowing the active end of the beam to move freely. A flexible membrane 30 is welded to the bearing at the free end to enclose the bearing and therefore, to prevent any deleterious substances from leaking into the housing and then onto the beam. The flexible membrane is such that it encloses the active load beam to prevent damage from environmental elements such as dust particles, moisture and so on. The membrane 30 is circular in section, as can be ascertained from FIG. 1B and is extremely thin, as approximately 0.005 to 0.010 inches. In this manner, the flexible membrane provides flexibility and movement without effecting load measurement.

Figure 2:
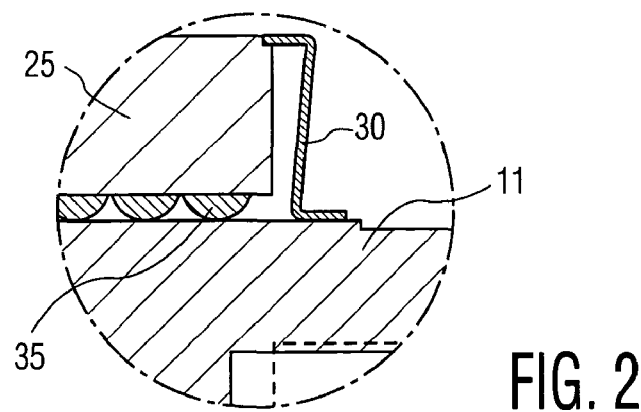
FIG. 2 is a detailed view of the linear bearing and a flexible diaphragm, according to this invention.

As seen in FIG. 2, there is a detailed view showing the flexible membrane 30 welded to the load body cell 11 and to the bearing 25. The inner race containing the roller bearings 35 of the bearing 25 abuts against the load cell body and completely surrounds the platform or load beam 16. In this manner, any force applied in the direction shown by arrow F1, which would tend to be off axis, will not cause the beam to bend because the bearing will prevent off axis movement. Any force applied in direction F2 will deflect the beam axially, because the free end moves axially, applying the force to the load beam without any bending or side load forces. Thus, side load and bending forces are, in fact, eliminated by addition of the linear bearing as shown in FIG. 1, allowing the transducer to respond accurately.

The addition of the bearing structure adds several benefits to the load cell design. The bearing structure 25 because of the outer housing 36, increases the side load stiffness of the structure over 30 times and increases the critical buckling load over 16 times. It provides a more rugged design for the handling and installation. Side loads are minimized, improving accuracy of pure axial tension and compression measurements because of the bearing.

Figure 3:
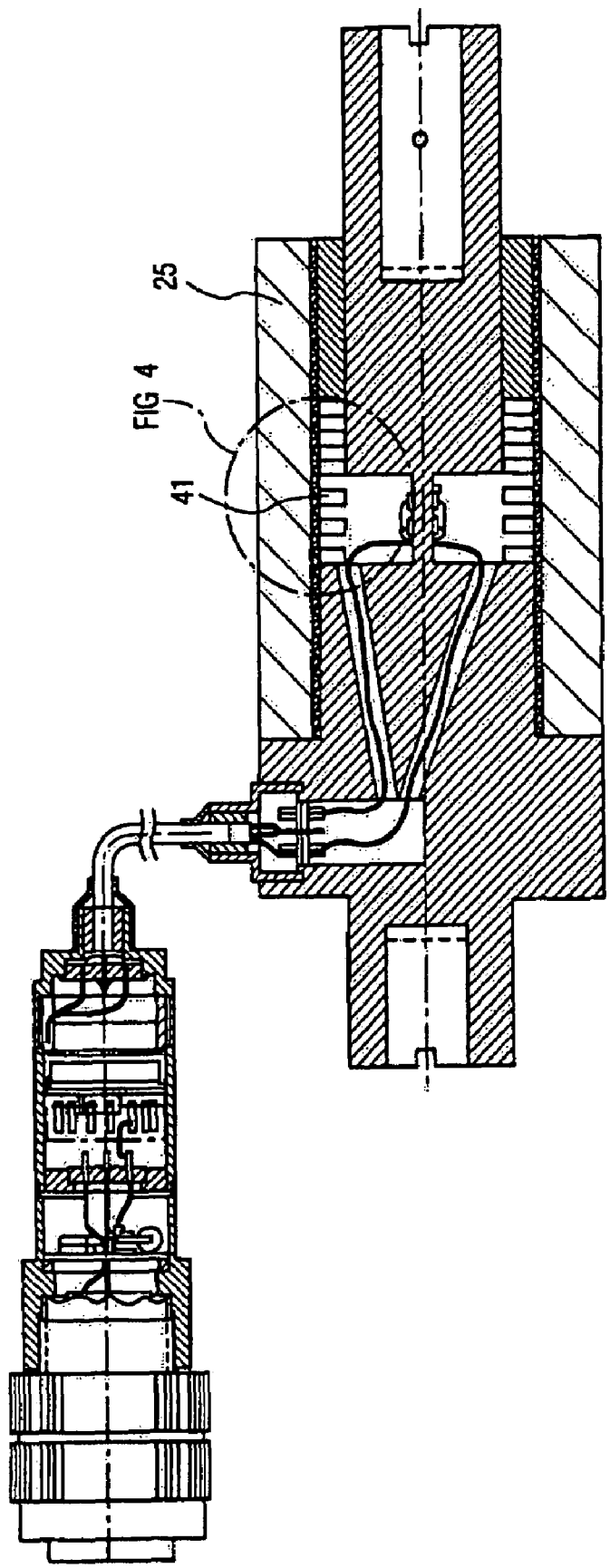
FIG. 3 is an alternate embodiment of a transducer, according to this invention.
Figure 4:
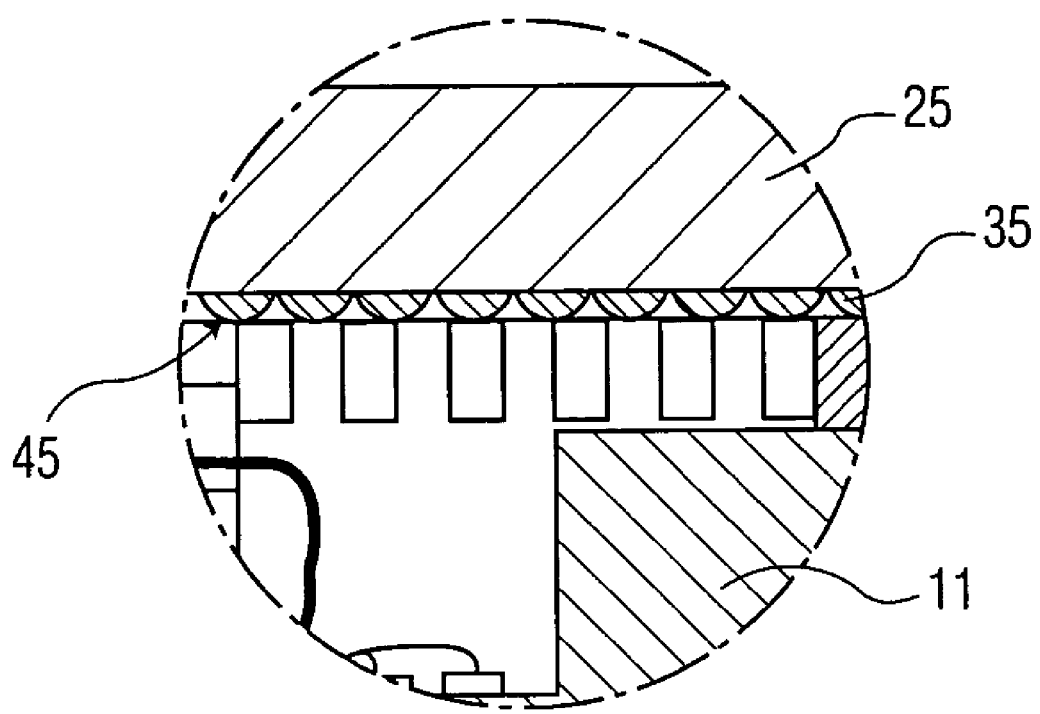
FIG. 4 is a detailed view of a portion of the transducer, according to this invention.

Referring to FIG. 3, there is shown another embodiment of a structure as depicted in FIG. 1. Again in FIG. 2 there is shown a bearing 25, which surrounds the load beam. Instead of a flexible diaphragm being welded to the outer periphery, the design shown in FIG. 3 contains an internal bellows 41. The bellows 41 is welded to the load cell body 14 as, for example, shown in the detailed scale of FIG. 4, where the weld 45 welds the metal bellows 41 to the fixed end 14 and active side 12. In this manner, the bellows operates as an environmental protector, thus surrounding the load beam to prevent it from being exposed to corrosive elements in the environment, while allowing movement of the free end without effecting the load sensitivity of the load beam 16. The bellows 50 is fabricated from an extremely thin material allowing the flexibility and movement without effecting load measurement.

Figure 5:
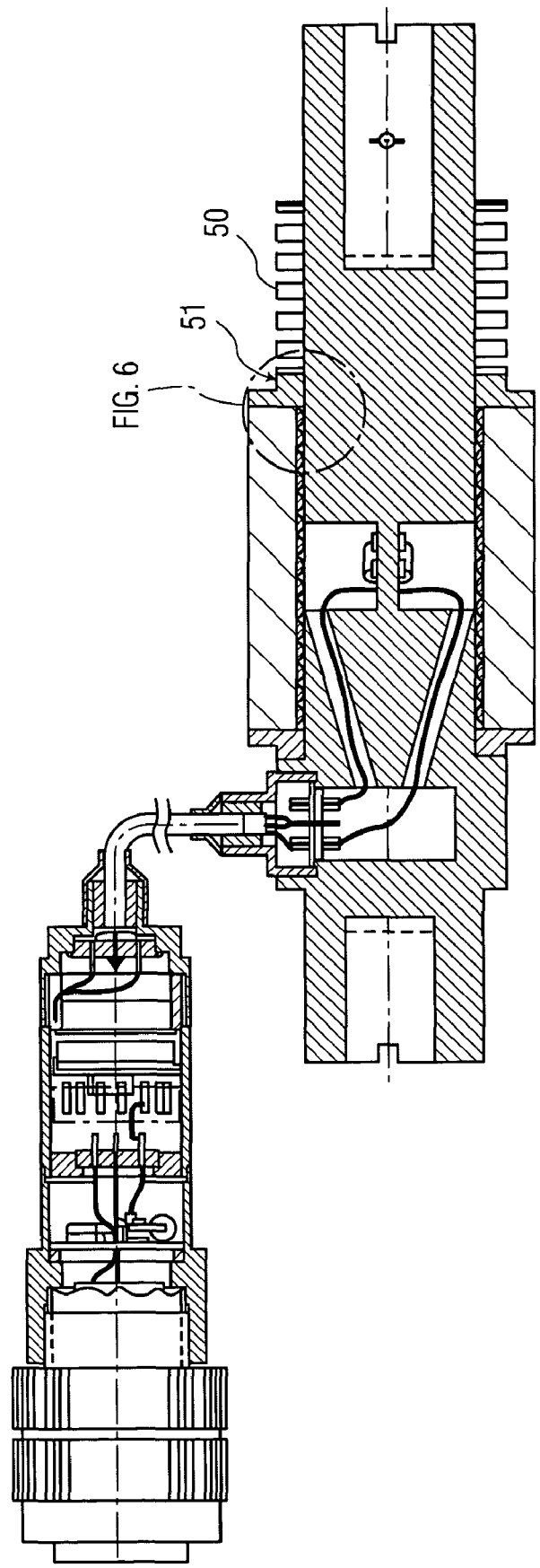
FIG. 5 is still another alternate embodiment of a transducer, according to this invention.
Figure 6:
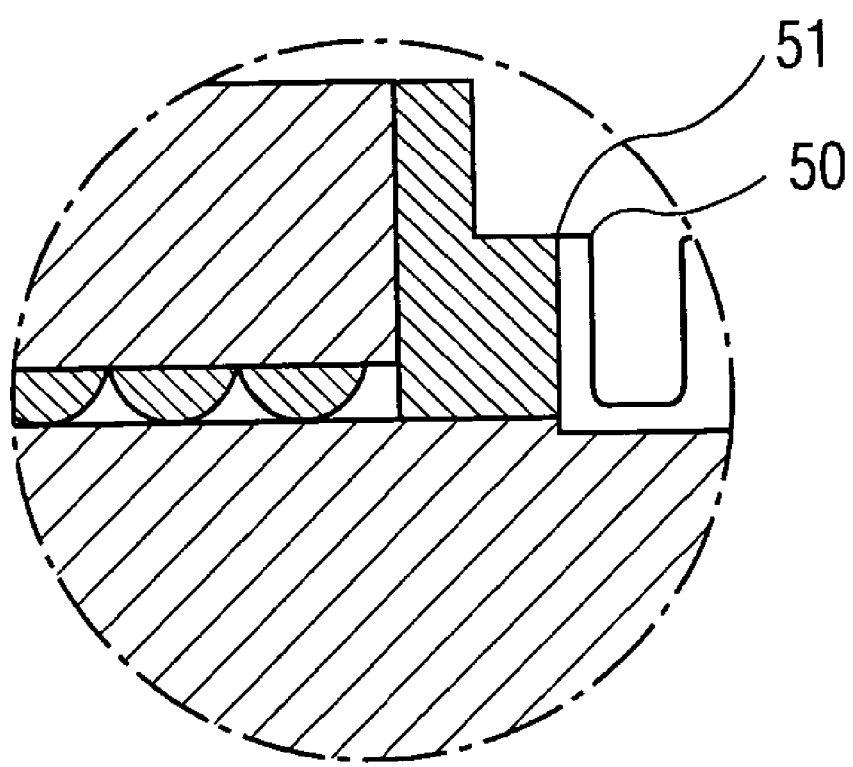
FIG. 6 is a detailed view of the encircled portion of FIG. 5, according to this invention.

FIG. 5 is an alternate embodiment where a bellows 50 is welded to the active side of the device 12 and bearing end and acts as the flexible diaphragm shown in FIG. 1. The bellows 50 is fabricated from an extremely thin metal and provides flexibility and movement without effecting load measurement. As shown in FIG. 6, there is a detailed scale view showing the bellow 50 welded to the housing by means of welds 51 also shown in FIG. 5.

Thus, as one can ascertain, side loads are eliminated because a linear bearing is placed around the beam. Unlike welding a metal sleeve over the beam, which decreases the sensitivity, one end of the linear bearing is free, allowing the active element or beam to move freely. With one end free, the load beam is exposed to full design strain, and the output or sensitivity of the strain gage bridge is maximized. In order to seal the free end to provide environmental protection, a flexible membrane member or diaphragm or an internal or external bellows is welded between the bearing end and the load beam. This provides a hermetic seal to protect the load beam and sensor strain gages.

It is also noted in the above cited application, a bellows configuration fabricated from stainless steel is utilized to surround a beam transducer and to protect it from the environment. This is shown in FIG. 1 of the above-noted patent, where a beam or platform 20 is enclosed and surrounded by a flexible bellows fabricated from an extremely thin material.

As one can determine from the present invention, one utilizes a linear bearing which is welded to the inactive end of the load beam. The other end of the bearing is not welded, allowing the active end of the beam to move freely. In this manner, the effects of side loads are totally prevented and the linear bearing enables the beam to move in a manner to mitigate against any side load or to prevent bending of the beam while accurately measuring axial loads. This configuration thus increases the stiffness of the load cell in the transverse direction. Thus, the beam cannot move in the transverse direction, but can move in the longitudinal direction. Because of the elimination of side loads, as indicated, one improves the accuracy of pure axial tension and compression measurements for such a beam transducer.

These and other structures will become apparent to those skilled in the art, and such alternatives are deemed to be encompassed within the claims as appended herein.

What is claimed is:

1. A force transducer, comprising:
   a beam having strain gages positioned thereon, said beam positioned between a front housing section and a rear housing section,
   a linear bearing having a bearing housing and an inner race, said bearing surrounding said beam and portions of said front and rear housing sections, with one end of said bearing housing fixed to one of said housing sections and with the other end of said bearing free to move, wherein said beam when subjected to an off-axis force will mainly respond to the axial tension and compression force and to mitigate the effects of side load forces.

2. The transducer according to claim 1 wherein further including means secured to said bearing for hermetically sealing said beam from damaging environmental elements.

3. The transducer according to claim 2 wherein said means is a flexible diaphragm secured to said bearing housing and one of said housing sections.

4. The transducer according to claim 1 wherein said beam is integrally formed between said first and second housing sections.

5. The transducer according to claim 1 wherein said strain gages are piezoresistive gages.

6. The transducer according to claim 1 wherein said strain gages are foil gages.

7. The transducer according to claim 1 wherein one end of said bearing is welded to the inactive housing section of said transducer.

8. A force transducer, comprising:
   a beam having strain gages positioned thereon, said beam positioned between a front housing section and a rear housing section;
   a linear bearing having a bearing housing and an inner race, said bearing surrounding said beam and a portion of said front and rear housing sections, with one end of said bearing housing fixed to one of said housing sections and the other end of said bearing free to move; and,
   compliant bellows surrounding said beam and positioned within said bearing for hermetically sealing said beam from damaging environmental elements;
   wherein, said beam mainly responds to the axial tension and compression force and to mitigate the effects of side load forces when subjected to an off-axis force.

9. The transducer of claim 8, wherein said bellows are secured to said bearing by a weld.

10. A force transducer, comprising:
    a beam having strain gages positioned thereon, said beam positioned between a front housing section and a rear housing section;
    a linear bearing having a bearing housing and an inner race, said bearing surrounding said beam and a portion of said front and rear housing sections, with one end of said bearing housing fixed to one of said housing sections and the other end of said bearing free to move; and,
    compliant bellows secured to one of said housing sections for hermetically sealing said beam from damaging environmental elements;
    wherein, said beam mainly responds to the axial tension and compression force and to mitigate the effects of side load forces when subjected to an off-axis force.

11. The transducer of claim 10, wherein said bellows are secured to said bearing by a weld.

* * * * *